United States Patent [19]

McBrien et al.

[11] Patent Number: 4,661,753

[45] Date of Patent: Apr. 28, 1987

[54] DIFFERENTIAL TORQUER

[75] Inventors: Gregory J. McBrien, Portland; Richard E. Swarts, Simsbury, both of Conn.

[73] Assignee: United Technologies Corporation, Hartford, Conn.

[21] Appl. No.: 692,071

[22] Filed: Jan. 15, 1985

[51] Int. Cl.⁴ .......................... G05B 17/00; H04B 3/28
[52] U.S. Cl. ........................................ 318/689; 307/90
[58] Field of Search ................... 307/90; 318/689, 436

[56] References Cited

U.S. PATENT DOCUMENTS 3,997,975 12/1975 Knapp ............................... 318/689 X
4,059,790 11/1977 Kennel ................................. 318/689

FOREIGN PATENT DOCUMENTS 2117118 1/1982 United Kingdom .

Primary Examiner—Theodore M. Blum
Assistant Examiner—John B. Sotomayor
Attorney, Agent, or Firm—Francis J. Maguire, Jr.

[57] ABSTRACT

A differential torquer having at least one bifilar winding mounted on the torquer is disclosed. The bifilar winding has opposing polarities and the torquer is particularly well suited for use in reducing the temperature sensitivity of torquer servo loops.

2 Claims, 7 Drawing Figures

DIFFERENTIAL TORQUER

CROSS REFERENCE TO RELATED APPLICATION

The invention described herein may employ some of the teachings disclosed and claimed in commonly owned copending application filed on even date herewith by McBrien U.S. Ser. No. 692,072, entitled DIFFERENTIAL TORQUER SERVO LOOP.

TECHNICAL FIELD

This invention relates to a differential torquer which may be controlled by a differential torquer servo loop. The torquer is particularly well suited for use in reducing the temperature sensitivity of such a servo loop.

BACKGROUND ART

Guidance, navigation, pointing and tracking systems use gyroscopes, accelerometers, and various other sensors to obtain highly accurate data. A gyroscope, for example, uses a spinning mass to sense rotation rates. One type of gyro is the rate integrating type which balances the input rate against a torque exerted by a current carrying coil in the presence of a magnetic field. The current can be scaled to produce the desired counter-torque, and measured to indicate the input rate, or integrated and measured to indicate the input change in angle.

Servo loops used in such sensor applications have some degree of temperature sensitivity. This sensitivity can be a serious problem depending upon the type of loop designed and the accuracy required. For example, in a rate integrating gyro application, as the current is varied to match the input rate, the thermal effects resulting from this current change produce errors in the data such as scale factor drift and bias drift. Existing ways of dealing with such problems are directed at precise temperature regulation of the servo loop environment. In the rate integrating gyro or any other such device it would therefore be desirable to supply constant power to the device's torquer regardless of the input rate. Existing designs switch the direction of constant current through a torquer to achieve constant power, e.g., a variable duty cycle scheme whereby the current is maintained constant by switching its direction through the torquer coil and modulating its duration, to control the net torque in a desired direction. This approach provides the desired constant power but introduces some effects that could compromise performance for low noise applications. This is due to the bidirectional pulse width modulating technique which introduces noise at harmonics of the modulating frequency.

DISCLOSURE OF THE INVENTION

The object of the present invention is to provide a differential torquer for use in a low noise torque balance loop which maintains constant power in the torquer coils.

According to the present invention of a unique "differential" torquer having dual windings is provided. Unidirectional currents may be applied to each of the windings to cause each of the torquer windings to oppositely exert directed torquing effects. The current in each of the windings may be sensed and the total current flowing in both windings may be summed and regulated at a constant value. At the same time, an error signal indicative of torquer position may be compared to a difference signal indicative of the difference between the two torquer currents. The difference between the error signal and the difference signal may then be maintained at zero so that the torques they represent are counter balanced.

In further accord with the present invention, the two torquer coils have opposing magnetic polarities. Instead of a single winding, a bifilar coil is created for each loop of the torquer assembly. All loops are wired together to produce an integral assembly of torquer coils. The four loose ends are then routed to the loop electronics to control the coil currents.

Thus a low noise torque balance loop with constant power may be achieved. A quiet loop can thus be created with less generation of switching transients and noise. Drift of the switching elements is no longer of any concern. Components affecting accuracy of the system are confined to a small number of low power elements, such as the resistors, op amps and the D/A in the rate integrating differential torquer loop. The loop can be easily trimmed by parallel elements across sense resistors as shown in the best mode embodiment. Also different update rates to the A/D can change the bit weight of the output data, which provides a means of dynamically adapting to different inputs.

These and other objects, features, and advantages of the present invention will become more apparent in the light of the following detailed description of an exemplary embodiment thereof as illustrated in the accompanying drawing.

BEST MODE FOR CARRYING OUT THE INVENTION

Figure 1:
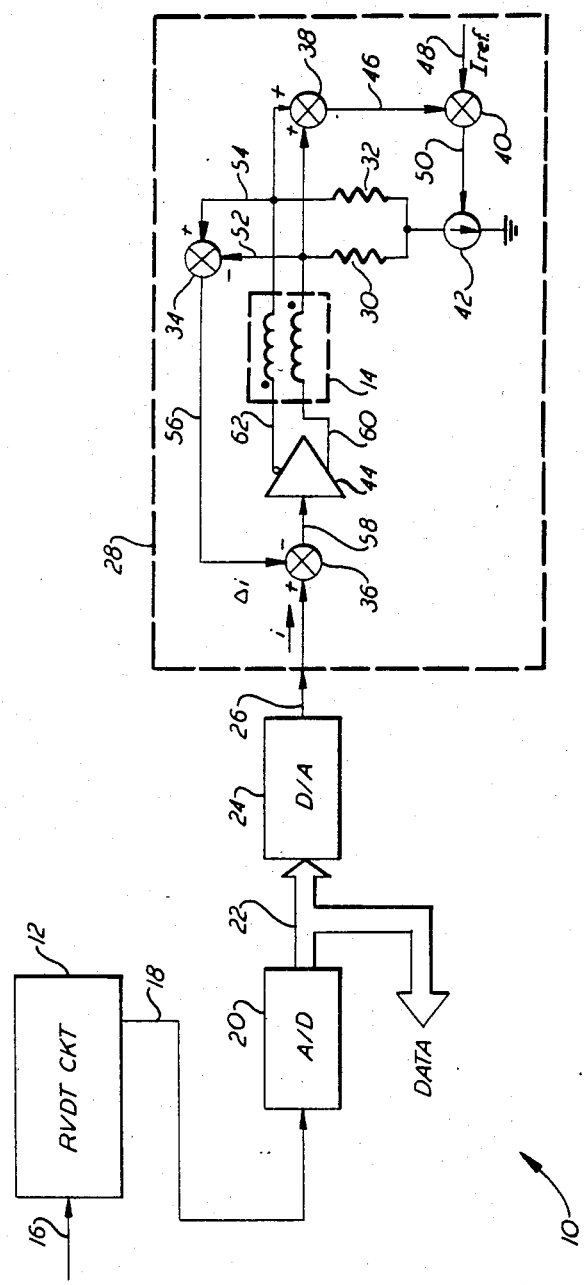
FIG. 1 is a simplified schematic block diagram illustration of a differential torquer servo loop utilizing a differential torquer according to the present invention.

FIG. 1 is a simplified schematic block diagram illustration of a differential torquer 14 according to the present invention along with a related servo control loop 10. The loop 10 includes a rotary variable differential transformer (RVDT) circuit 12 which monitors the position of the differential torquer 14. The servo loop is further disclosed and claimed in copending application U.S. Ser. No. 692,072 invented by McBrien and assigned to the assignee of this invention. The RVDT circuit 12 is responsive to a sinusoidal excitation signal on a line 16 which in the best mode embodiment disclosed herein has a frequency of 23.27 KHZ. The sinusoidal signal on the line 16 is used for exciting the RVDT primary and for demodulating the signal picked up on the RVDT secondaries. The RVDT circuit 12 provides a position output signal on a line 18 to an analog to digital converter 20 which converts the analog signal on the line 18 to a digital signal on a line 22. The digital signal on the line 22 is provided as data for use elsewhere within the guidance and/or navigation system and is also provided to a digital to analog converter 24 for reconversion to analog signal form. A reconverted signal on a line 26 is provided to a control circuit 28 which includes the torquer 14, sensing resistors 30, 32, summing junctions 34, 36, 38, 40, a total current controller 42, and an amplifier 44. The circuit 28 of FIG. 1 is shown in greatly simplified form for illustrative purposes.

The sensing resistors 30, 32 sense the separate currents in each of the torquer 14 windings. Signals from each of the sensing resistors are presented to the summing junction 38 where they are summed to provide a summed total current signal on a line 46 for comparsion with a reference current signal on a line 48 at a junction 40. A total current control signal on a line 50 is provided to the current controller 42 for controlling the total current through the torquer windings at a constant power level. The same sensed signals on lines 52, 54 are summed at the junction 34 and a difference signal on a line 56 indicative of the difference between the two currents in the two torquer windings is provided to the junction 36. The difference signal on the line 56 is subtracted from the position signal on the line 26 and a signal indicative of their difference is provided on line 58 to amplifier 44 where it is amplified with positive and negative polarities for presentation on lines 60, 62 to the torquer windings. Thus, as long as a difference exists between the position signal on the line 26 and the difference signal on the line 56, the signal on the line 58 will continue to attempt to rebalance the position of the torquer until the signals on the line 26 and 56 are equal.

The A/D converter 20 and the D/A converter 24 are inserted into the servo loop 10 in order to remove A/D conversion errors from the output data. Of course, different update rates to the A/D can change the bit weight of the output data, which provides a means of dynamically adapting to different inputs.

Figure 2:
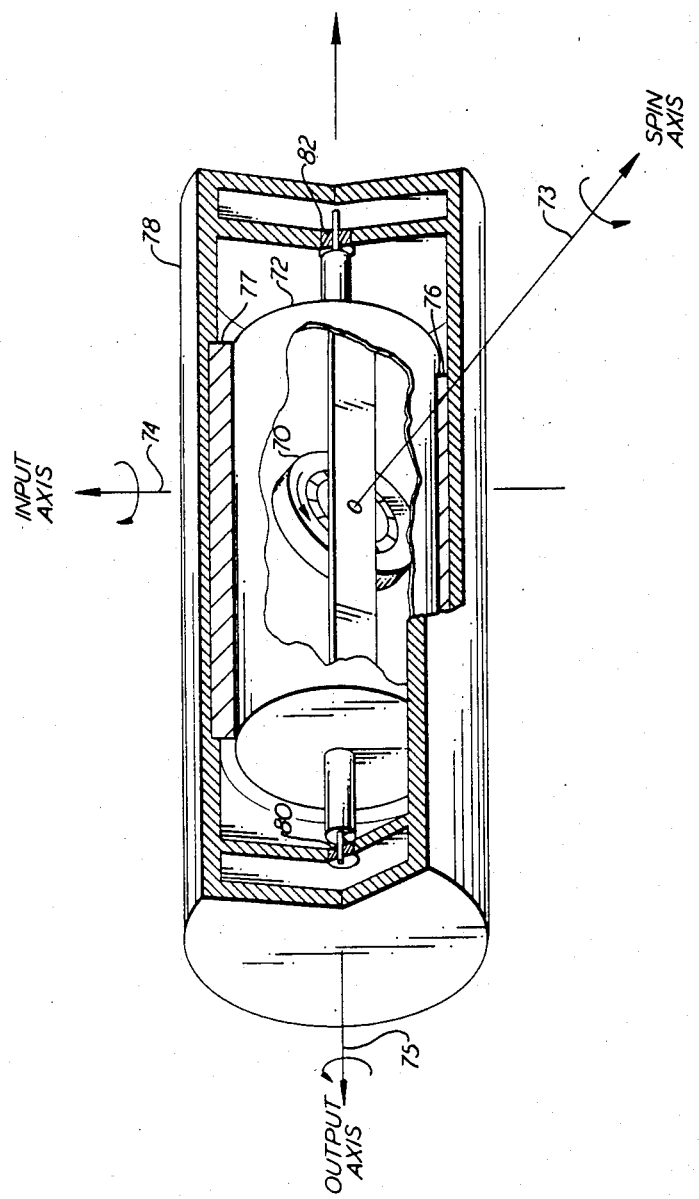
FIG. 2 is a cut away view of a precision gyroscope which contains a differential torquer according to the present invention which may be controlled by a servo loop.

FIG. 2 is an illustration of a precision gyroscope in which the differential torquer of the present invention may be utilized. A rotating member 70 is sealed within a hollow cylinder 72 which forms the inner gimble of the gyroscope. The rotating member rotates about a spin axis 73. An input rate about an input axis 74 is translated into an output torque about an output axis 75. The cylinder has a plurality of coils (not shown in FIG. 2; but see Fig. 3) mounted around its sides which are excited externally and carry currents which interact with a permanent magnetic field provided by permanent magnets 76, 77. The cylinder 72 is mounted in a gyro case 78 with a fluid surrounding the cylinder. The density of the fluid is chosen to exactly float the cylinder, thus removing the weight of the inner gimble from bearings 80, 82 and greatly relieving the bearing frictional load. An input rate to the gyro produces a proportional rate about the output axis of the instrument. Similarly, in a torque servo loop an input torque about the input axis of the gyro produces a proportional torque about the output axis. The sensor loop creates an equal and opposite torque with the current carrying coils, thus maintaining the float fixed relative to the case. It is the current to the torquer that is used as the measure of angular rotation of the gyro and hence of the vechicle in which it is mounted.

Figure 3:
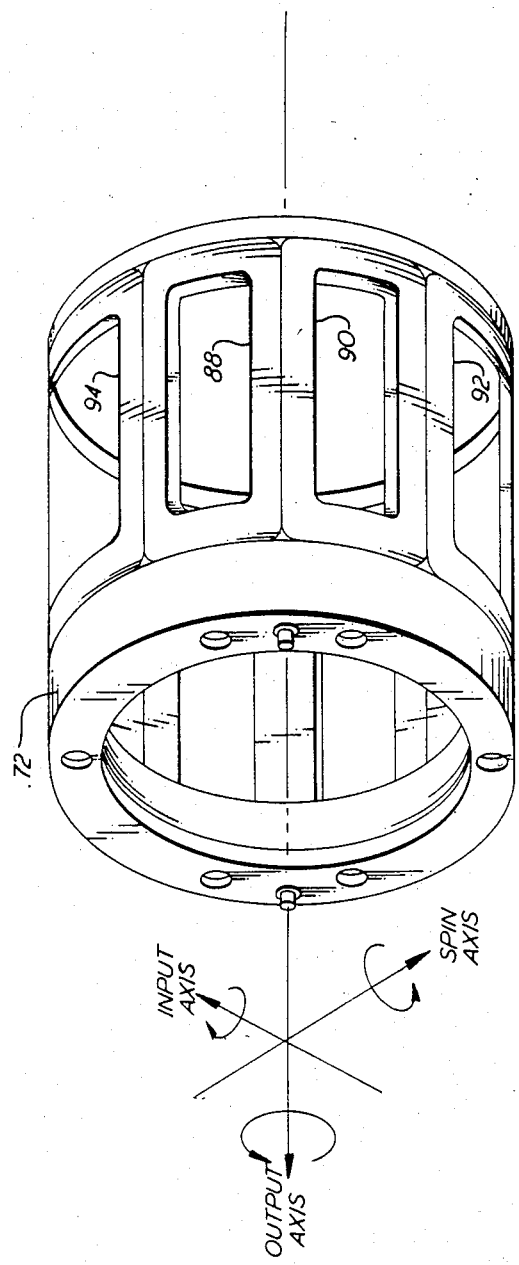
FIG. 3 is a more detailed view of one embodiment of a differential torquer according to the present invention.
Figure 4:
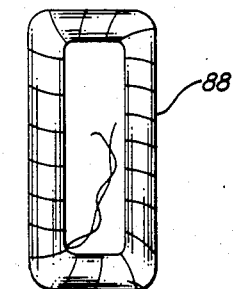
FIG. 4 is an illustration of an individual coil of the torquer of FIG. 3.
Figure 5:
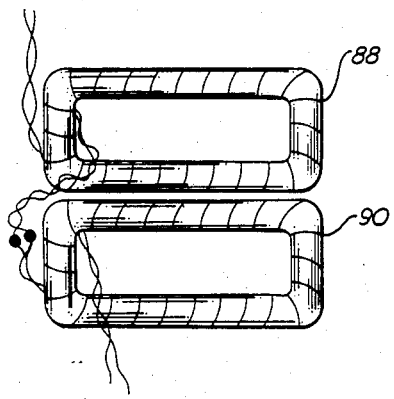
FIG. 5 is an illustration of a pair of coils showing the electrical hook-up.

FIG. 3 is a more detailed illustration of the inside of the cylinder 72 showing a plurality of coils 88, 90, 92 . . . 94 mounted around its sides. Each of the coils is made up of a multi-loop bifilar winding as shown in FIG. 4. FIG. 5 shows two of the loops connected electrically.

Bifilar windings were selected for each of the loops in order to provide the best possible symmetry of coils thereby insuring symmetry of magnetic torque in each set of windings for this unique "differential torquer". A single wire winding for alternate loops could also be used. However, the bifilar method is superior.

Figure 6:
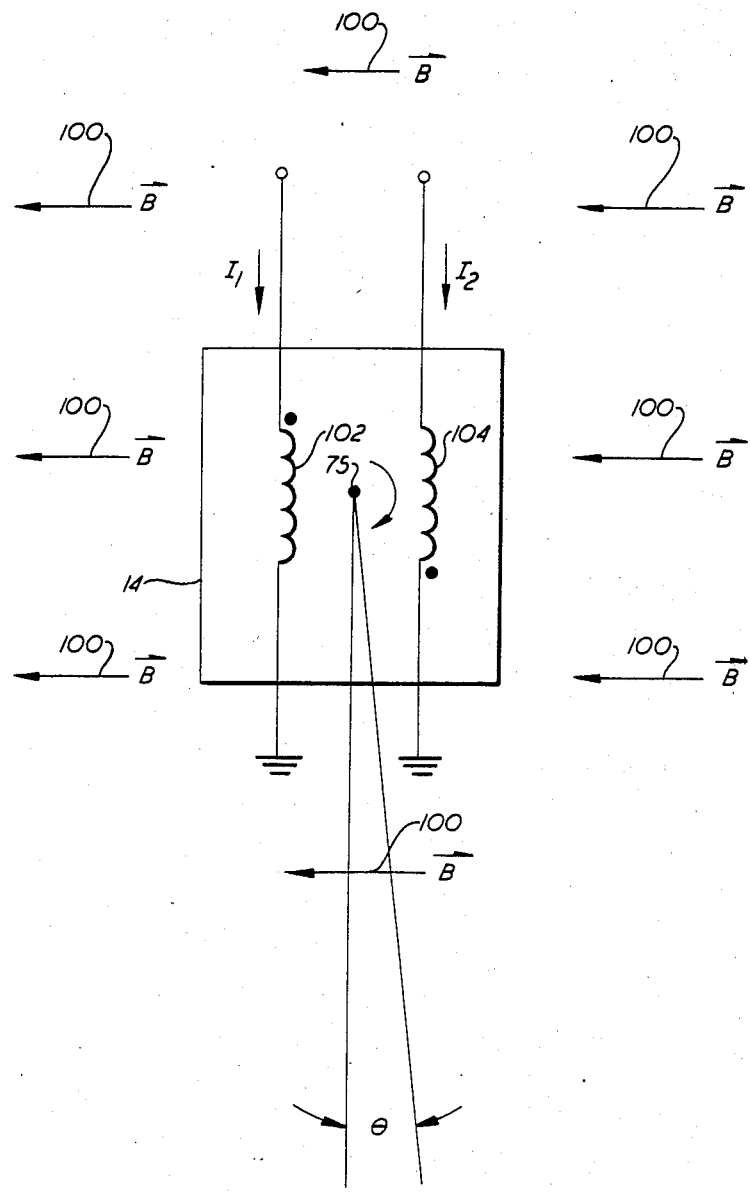
FIG. 6 is an illustration of a differential torquer in a stationary magnetic field undergoing an incremental rotation.

FIG. 6 is an illustration of the torquer 14 of FIG. 1 under the influence of a magnetic field from the permanent magnets 76, 77 of FIG. 2. Lines of magnetic induction 100 are shown penetrating the torquer 14. These lines of induction are stationery with respect to the case 78 of FIG. 2 and the torquer 14 rotates to a very slight degree about axis 75 under the influence of an externally applied rate about the input axis 74 of FIG. 2. Individual coils 102, 104 within the torquer 14 are provided with unidirectional DC as indicated by currents $I_1$ and $I_2$. These currents create opposing magnetic fields and are controlled by the servo loop to produce exactly the correct amount of magnetic torque to counterbalance the applied input rate. In other words, the applied input rate will cause a slight rotation of the torquer through an angle theta ($\theta$) as shown. The servo loop will immediately act to restore the torquer to its original position and the relationship between $I_1$ and $I_2$ will be a measure of the input rate magnitude and direction.

Figure 7:
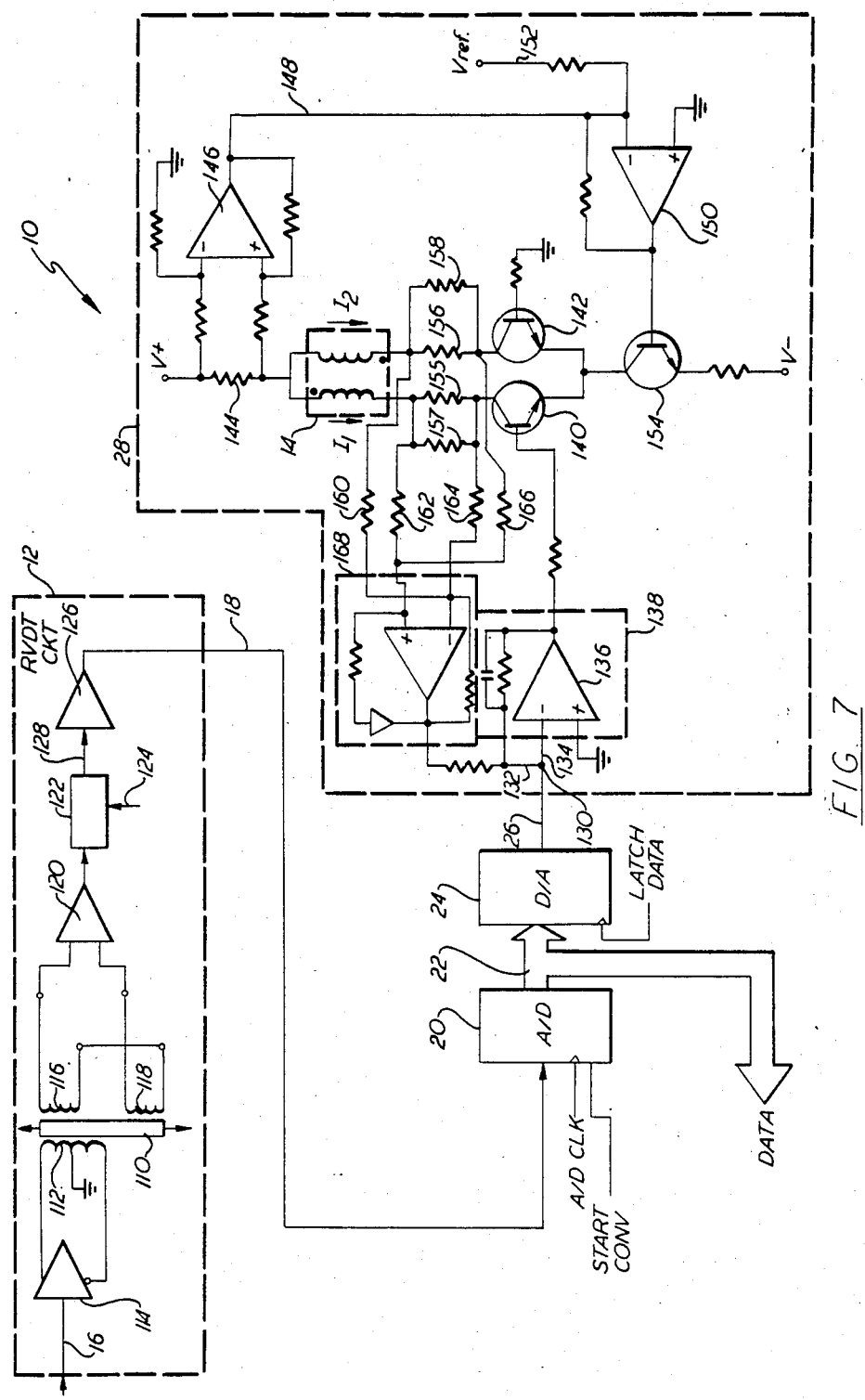
FIG. 7 is a more detailed schematic block diagram illustration of the servo loop of FIG. 1.

FIG. 7 is a more detailed schematic block diagram illustration of the circuitry of FIG. 1. The RVDT circuit 12 is shown having a moveable iron core 110 which is attached to the torquer 14 in a manner which permits the measurement of rotary motion. A primary winding 112 is provided with a sinusoidal voltage from an amplifier 114 which amplifies an input sinusoid signal on the line 16. Two secondary windings 116, 118 are connected in series opposition so that the transformer output is the difference of the two secondary voltages. When the core is centered, the two secondary voltages are equal and the transformer output is zero. This is the balance or null position. When the core is displaced from the null point, the two secondary voltages are no longer alike and the transformer produces an output voltage. The output voltage is designed to vary linearly with core position over a small range. Motion of the core in the opposite direction produces a similar affect with 180° phase reversal of the alternating output voltage. The output voltage is applied to an amplifier 120 and a demodulator 122. The demodulator 122 demodulates the amplified pickoff using a demodulation reference signal on a line 124 which has a frequency equal to that of the signal on the line 16. A buffer 126 responds to the demodulated signal on a line 128 and provides the position output signal on the line 18 to the A/D converter 20. After A/D conversion the digital data on the line 22 is provided to the navigation/guidance system and is then reconverted in the D/A converter 24 to an analog signal on the line 26. The position signal on the line 26 is summed at a junction 130 with a signal on a line 132 indicative of the difference ($I_1 - I_2$) between the currents in the torquer 14. The summed voltage on a line 134 is presented to the inverting input of a difference amplifier 136 configured as an integrator 138. Whenever a difference exists between the position signal on the line 26 and the difference signal on the line 132 the integrator 138 attempts to zero its input on the line 134 and it does this by readjusting the magnitudes of the currents ($I_1$, $I_2$) through the individual windings of the torquer 14. This is done with the integrator controlling the turn-on and turn-off times of the steer-through transistors 140, 142.

The total current through the torquer is sensed in a resistor 144 and the sensed voltage is provided to a differential amplifier 146 which provides an output voltage on a line 148 to a second differential amplifier 150 which provides a means of controlling the total current through the torquer at a constant value by controlling a transistor switch 154.

A pair of sensing resistors 155, 156 are used to sense the individual currents through the individual torquer coils. Parallel trim resistors 157, 158 are provided to fit the individual characteristics of individual circuits. The voltages across these sensing resistors are conditioned by a network of resistors 160–166 and a differential amplifier circuit 168 which provides the signal on the line 132 indicative of the difference in the two currents ($I_1 - I_2$).

Although the differential torquer has been described in an application involving a gyroscope, it should be understood by those skilled in the art that the differential torquer according to the present invention could as easily be used in other sensor applications including accelorometer applications.

Although the invention has been shown and described with respect to illustrated embodiments thereof, it should be understood by those skilled in the art that the foregoing and various other changes, ommissions, and additions in the form and detailed thereof may be made therein without departing from the spirit and scope of the invention.

We claim:

1. A differential torquer, comprising:
    a first winding for carrying a varying first portion of a constant magnitude uni-directional direct electrical current for providing a first magnetic field which tends to produce a first counter-balancing torque;
    a second winding for carrying a varying second portion of said constant magnitude uni-directional direct electrical current for providing a second magnetic field which opposes said first magnetic field and tends to produce a second counter-balancing torque which opposes said first counter-balancing torque; and
    a housing upon which said first and second windings are mounted for providing a structure for summation of said first and second magnetic fields and for summation of said first and second counter-balancing torques which together counteract an externally applied input torque tending to rotate said housing, the difference in magnitudes of said first and second varying portions for said constant magnitude uni-directional direct electrical current being indicative of the magnitude of the counter-balancing torque needed to counter-balance said externally applied input torque.

2. The differential torquer of claim 1, wherein said first and second windings together comprise a bifilar coil winding mounted on said housing, said bifilar coil winding being a twisted pair of first and second insulated wires coiled to provide a winding in which said varying first and second portions of said constant magnitude uni-directional direct electrical current may be provided in said first and second wires, respectively, such that the total summed magnitude of direct current through both wires may be controlled at a constant level and such that variable magnitude oppositely directed magnetic fields are thereby produced and combined for interacting with an externally applied stationary and constant magnetic field for providing counter-balancing torques for counter-acting externally applied input torques.

* * * * *

UNITED STATES PATENT AND TRADEMARK OFFICE
CERTIFICATE OF CORRECTION

PATENT NO. : 4,661,753

DATED : April 28, 1987

INVENTOR(S) : Gregory J. McBrien et al

It is certified that error appears in the above-identified patent and that said Letters Patent is hereby corrected as shown below:

Column 6, line 18, Claim 1. Cancel "for" and substitute -- of --

Signed and Sealed this

Seventeenth Day of November, 1987

Attest:

DONALD J. QUIGG

*Attesting Officer*  *Commissioner of Patents and Trademarks*